United States Patent
Muller et al.

(10) Patent No.: US 11,283,907 B2
(45) Date of Patent: Mar. 22, 2022

(54) DETERMINING STATE OF VIRTUAL ROUTER INSTANCE

(71) Applicant: Red Hat, Inc., Raleigh, NC (US)

(72) Inventors: Assaf Muller, Raanana (IL); Sylvain Afchain, Annet sur Marne (FR)

(73) Assignee: Red Hat, Inc., Raleigh, NC (US)

( * ) Notice: Subject to any disclaimer, the term of this patent is extended or adjusted under 35 U.S.C. 154(b) by 21 days.

(21) Appl. No.: 14/840,317

(22) Filed: Aug. 31, 2015

(65) Prior Publication Data

US 2017/0063731 A1 Mar. 2, 2017

(51) Int. Cl.
*H04L 12/24* (2006.01)
*H04L 69/325* (2022.01)
*H04L 43/00* (2022.01)

(52) U.S. Cl.
CPC .......... *H04L 69/325* (2013.01); *H04L 43/00* (2013.01)

(58) Field of Classification Search
None
See application file for complete search history.

(56) References Cited

U.S. PATENT DOCUMENTS

| | | | |
|---|---|---|---|
| 6,938,095 B2 | 8/2005 | Basturk et al. | |
| 7,061,858 B1 | 6/2006 | DiBenedetto et al. | |
| 7,590,760 B1 | 9/2009 | Banks et al. | |
| 7,636,364 B2 * | 12/2009 | Fotedar | H04L 45/00 370/401 |
| 8,014,274 B1 | 9/2011 | Amicangioli et al. | |
| 8,725,820 B2 | 5/2014 | McNamee et al. | |
| 8,799,511 B1 | 8/2014 | Balakrishna et al. | |
| 9,100,274 B1 * | 8/2015 | Ghosh | H04L 49/70 |
| 2013/0191831 A1 | 7/2013 | Goyal et al. | |
| 2016/0191304 A1 * | 6/2016 | Muller | H04L 49/70 370/220 |
| 2017/0005915 A1 * | 1/2017 | Mirsky | H04L 45/26 |

OTHER PUBLICATIONS

Birman, Ken et al., "Adding High Availability and Autonomic Behavior to Web Services", Dept. of Computer Science, Cornell University, Ithaca, NY, 10 pages http://www.cs.cornell.edu/Info/Projects/Spinglass/public_pdfs/Adding%20High%20Availability%20and%20Autonomic%20Behavior%20to%20Web%20Services.pdf (Last accessed Aug. 28, 2015).

Muller, Asaf, "Layer 3 High Availability", assafmuller.com, Aug. 16, 2014, 14 pages http://assafmuller.com/2014/08/16/layer-3-high-availability/.

"Report HA Router Master", GitHub, Inc., Nov. 26, 2014, 4 pages https://github.com/openstack/neutron-specs/blob/master/specs/kilo/report-ha-router-master.rst.

Wang, Yi, et al., Virtual Routers on the Move: Live Router Migration as a Network-Management Primitive, SIGCOMM '08, Aug. 17-22, 2008, Seattle, WA, 12 pages http://www.cs.princeton.edu/courses/archive/fall10/cos561/papers/VROOM08.pdf.

* cited by examiner

*Primary Examiner* — Willie J Daniel, Jr.
(74) *Attorney, Agent, or Firm* — Lowenstein Sandler LLP

(57) ABSTRACT

Systems and methods for determining the state of a virtual router instance. An example method comprises: monitoring, by a processing device of a host computer system, a network interface associated with an instance of a virtual router; responsive to determining that a certain IP address has been assigned to the network interface, identifying a state of the instance of the virtual router as a master state; and transmitting a message identifying the state of the instance of the virtual router.

20 Claims, 4 Drawing Sheets

DETERMINING STATE OF VIRTUAL ROUTER INSTANCE

TECHNICAL FIELD

The present disclosure relates to virtual router management, and more particularly, to determining the state of a virtual router instance.

BACKGROUND

"Router" herein shall refer to a computer system equipped with at least two network interfaces and employed for routing Open Systems Interconnection layer 3 (network layer) packets between the networks connected to the respective network interfaces.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
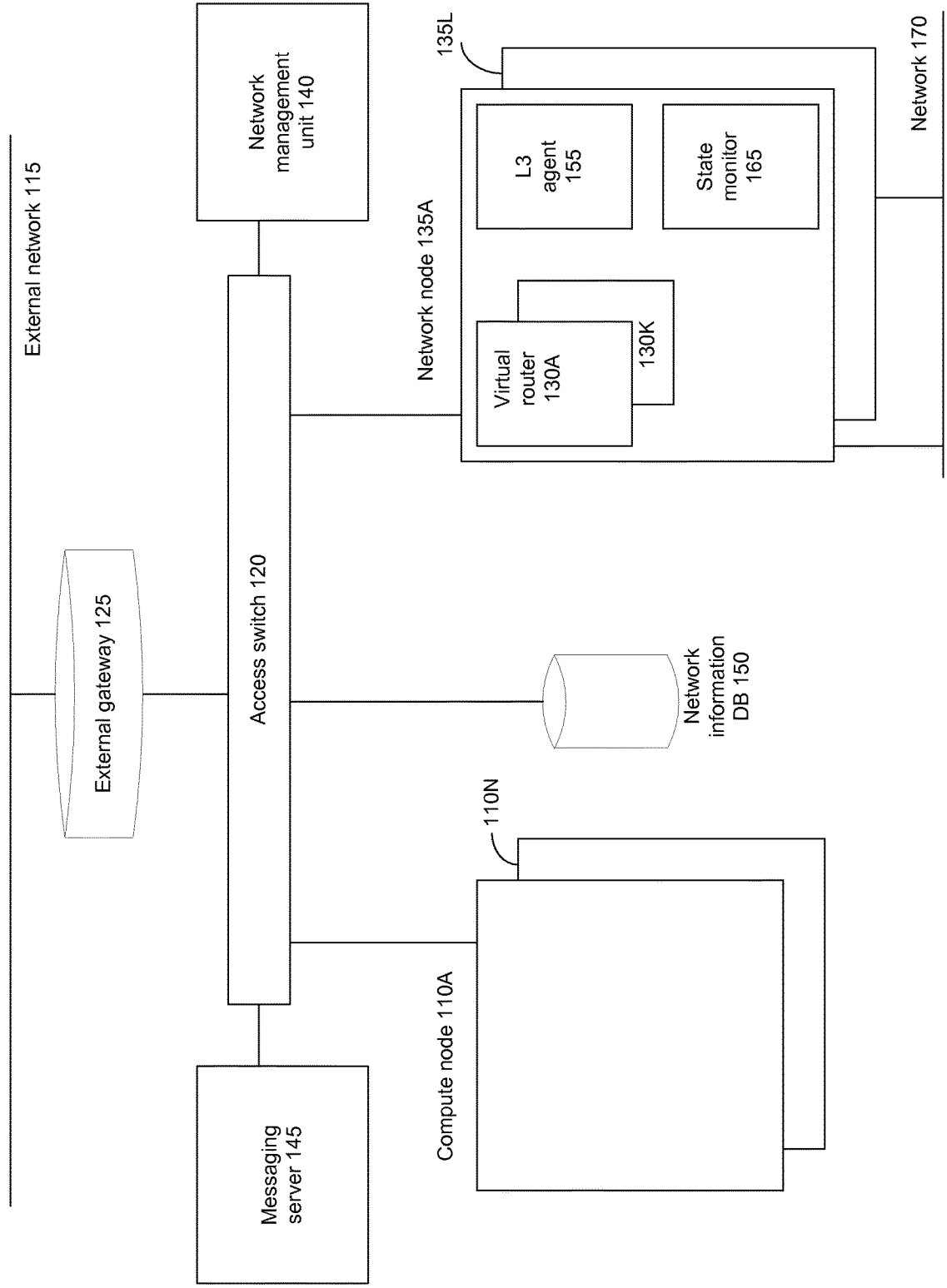
FIG. 1 depicts a high-level network diagram of an example cloud computing environment 100 in which the systems and methods for determining a state of a virtual router instance may be implemented, in accordance with one or more aspects of the present disclosure.

Described herein are systems and methods for determining the state of a virtual router instance. Virtual routers may be employed in cloud computing environments.

In a cloud computing environment, a networking service may support a multi-tenant model, in which each tenant may have one or more private networks with customized Internet Protocol (IP) addressing schemes. The networking service exports a networking application programming interface (API) that includes virtual network, subnet, and port abstractions that are designed to describe various networking resources. In various illustrative examples, the networking service may enable advanced cloud networking use cases, such as high-availability (HA) multi-tiered web applications.

In order to host high availability applications, a variety of network services, including Open Systems Interconnection (OSI) Layer 3 (L3) routers, should also possess high availability features. In certain implementations, HA layer 3 forwarding may be implemented by employing virtual L3 routers. In an illustrative example, a plurality of instances of a virtual router may be configured to run on a plurality of network nodes. Floating IP addresses may be reserved for the interfaces of the virtual router, and may be assigned to one of the instances of the virtual router, which is called master instance. Other instances of the virtual router may be referred to as standby instances. The floating IP address associated with the internal interface of the virtual router may be specified as the default gateway address for participating hosts on the tenant network, thus enabling L3 routing for applications being executed by those hosts. If the master instance of the virtual router or its uplink fails, one of the standby instances may be elected as the new master, and the IP addresses of the external and internal interfaces of the virtual router may be assigned to the newly elected master instance.

In certain implementations, the network management unit may not have the information allowing it to identify the HA state (e.g., master or standby) of a given virtual router instance and/or to identify the node that is hosting the current master instance of a given virtual router. Aspects of the present disclosure address this and other deficiencies by providing a method of determining the state of a virtual router instance. In accordance with one or more aspects of the present disclosure, an L3 agent running on a network node may monitor the IP address assignment to the network interfaces of the local node. Whenever a floating IP address that is reserved for a virtual router is assigned to one of the interfaces of the local node, the virtual router instance running on the node is assumed to become the master instance. Conversely, whenever a floating IP address that is reserved for a virtual router is removed from one of the interfaces of the local node, the virtual router instance running on the local node is assumed to become a standby instance.

The L3 agent may aggregate the detected state transitions for a certain period of time, and send a notification to the network management unit, which may store the received state information in the network information database. Responsive to receiving a virtual router state request, the network management unit may query the database and provide the latest state information with respect to the virtual router and/or the network node specified by the request.

The state information may be utilized, e.g., by a system administrator to determine whether any master router instances are running on a given network node, which may be useful in performing the node maintenance. Additionally or alternatively, the state information may be used to identify misconfigured virtual routers (e.g., virtual routers having two or more simultaneously active master instances).

FIG. 1 depicts a high-level network diagram of an example cloud computing environment 100 in which the systems and methods for determining a state of a virtual router instance may be implemented, in accordance with one or more aspects of the present disclosure. As schematically illustrated by FIG. 1, example cloud computing environment 100 may comprise one or more compute nodes represented by host computer systems 110A-110N hosting virtual machines that are assigned to one or more cloud tenants. Compute nodes 110A-110N may be communicatively coupled to an external network 115 via an access switch 120 and a gateway 125. The L3 routing between compute nodes 110A-110N and gateway 125 may be provided by one or more virtual routers 130A-130K running on one or more network nodes 135A-135L. In certain implementations, virtual routers 130A-130K may further provide stateless filtering of OSI layer 3 packets being routed between compute nodes 110A-110N and gateway 125.

Network nodes 135A-135L may be provided by computer systems (servers) employed to handle and manage the network traffic within example cloud computing environment 100. Network management unit 140 may be running on a dedicated computer system (server) or may be collocated with one or more functional components of example cloud computing environment 100. Network management unit 140 may provide the centralized management functions with respect to network nodes 135A-135L. In certain implementations, network management unit 140 may expose an application programming interface (API) (e.g., an HTTP-based request-response protocol) through which other functional components of example cloud computing environment 100, such as an administrative user interface, may issue commands and receive responses to and from network management unit 140. In certain implementations, network management unit 140 may communicate, e.g., via a messaging server 145, to a network service database 150, where the network configuration and other relevant information may be stored.

In accordance with one or more aspects of the present disclosure, network management unit 140 may configure an L3 agent 155 running on a network node 135 to run instances of one or more virtual routers 130. Each virtual router instance may, at any given point in time, be configured as master (active) or standby (inactive) instance.

Floating IP addresses may be reserved for the interfaces of a virtual router 130, and may be assigned to the master instance. Other instances of the virtual router may be referred to as standby instances. The same floating IP address may be specified as the default gateway address for compute nodes 110A-110N, thus providing L3 routing between virtual machines running on compute nodes 110A-110N and external gateway 125.

If the master instance of the virtual router or its uplink fails, one of the standby instances may be elected as the new master. In an illustrative example, a state monitor process 165 may run on each network node 135. The master instance of a virtual router may be configured to transmit, over a highly-available network 170, heartbeat messages to the network nodes running the standby instances of the same virtual router. As the heartbeat messages should be transmitted with a pre-defined frequency (e.g., ever 2 seconds), a state monitor process associated with a standby instance failing to receive a pre-defined number of consecutive heartbeat messages from the master instance may initiate a new master instance election among the standby instances. The master instance election may be performed using pre-configured node priorities, randomly assigned identifiers, and/or unique identifiers associated with the network nodes on which the standby instances are running. Once the new master instance is elected, the floating IP addresses which have been reserved for the interfaces of the corresponding virtual router may be disassociated from the failed master instance and assigned to the newly elected master instance.

In order to provide, to network management unit 140, the virtual router instance state information, L3 agent 155 running on each network node 135 may be employed to monitor the IP address assignment to the network interfaces on the node. Whenever a floating IP address that is reserved for a virtual router is assigned to one of the interfaces of network node 135, the virtual router instance running on this node is assumed to become the master instance of a corresponding virtual router. Conversely, whenever a floating IP address that is reserved for the virtual router is removed from one of the interfaces of network node 135, the virtual router instance running on this node is assumed to become a standby instance.

L3 agent 155 may aggregate, into a single message to be transmitted to network management unit 140, the detected state transitions for a certain period of time (e.g., 15 seconds), thus accumulating the information with respect to the state transitions of instances of multiple virtual routers running on the network node. L3 agent 155 may transmit, via a messaging server, the status message to network controller 140, which upon receiving the message, may store the received state information in the network information database 150. Responsive to receiving a virtual router state request, network management unit 140 may query network information database 150 to retrieve the state information with respect to the virtual router and/or the node specified by the request.

Figure 2:
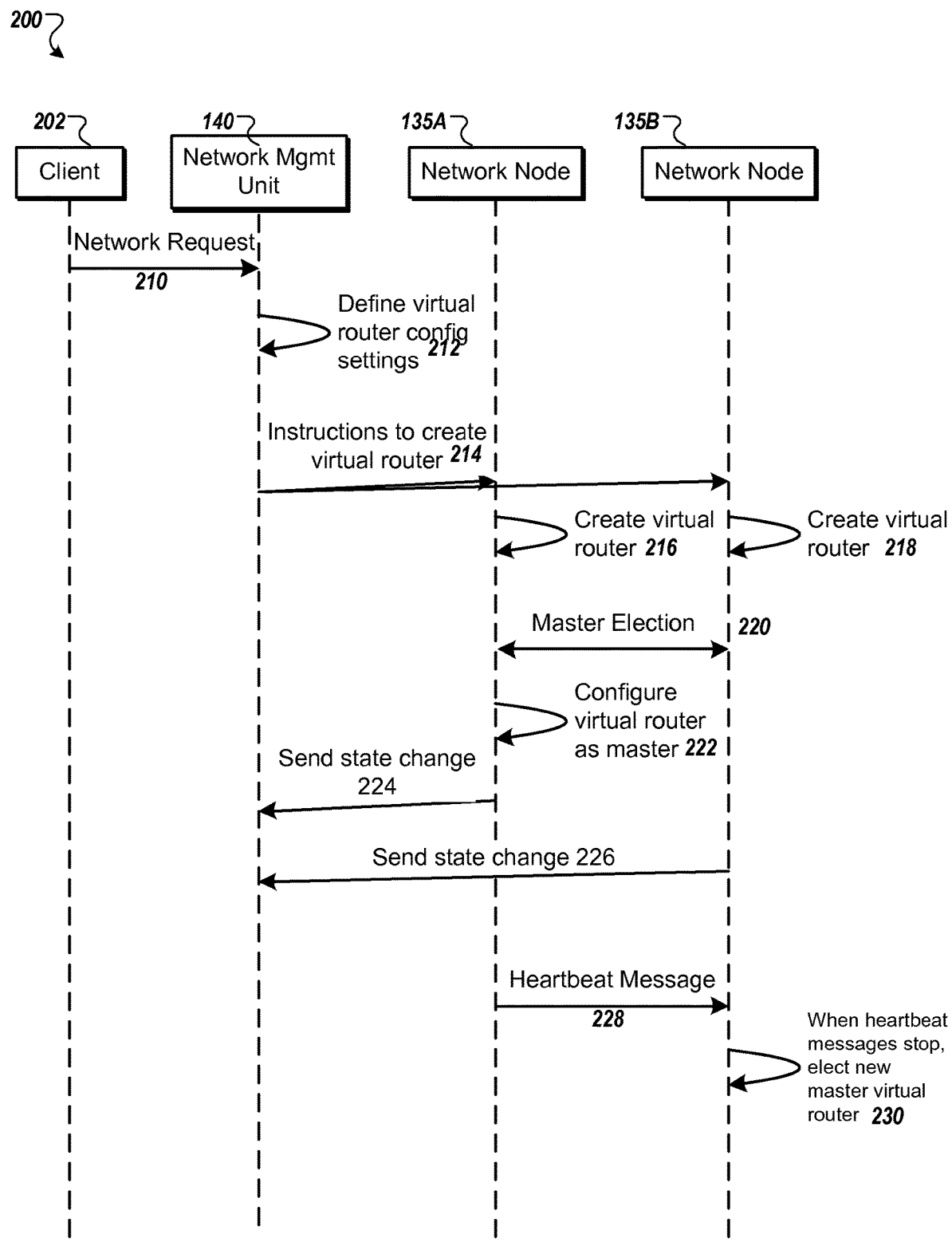
FIG. 2 schematically illustrates a sequence diagram 200 for determining a state of a virtual router instance in an example cloud computing environment, in accordance with one or more aspects of the present disclosure.

FIG. 2 schematically illustrates a sequence diagram 200 for determining a state of a virtual router instance in an example cloud computing environment, in accordance with one or more aspects of the present disclosure. As schematically illustrated by FIG. 2, client 202 may transmit, to network management unit 140, a request 210 to create a virtual router. Responsive to receiving the request, network management unit 140 can define new virtual router configuration settings (212) for the virtual router and can store the router configuration settings in a data storage (e.g., network service database 150 of FIG. 1). The virtual router configuration settings can comprise Media Access Control (MAC) and IP addresses of the internal and external interfaces of the router table and a routing table to be implemented by the router. Network management unit 140 can cause multiple instances of a virtual router to be created, each on a different network node 135. In the illustrative example of FIG. 2, network management unit 140 may cause the L3 agents residing on network nodes 135A-135B to create identical instances of a virtual router (214). The command to create an instance of a virtual router transmitted by network management unit 140 to each network node 135 can comprise the virtual router configuration settings.

For each virtual router to be created, network management unit 140 may select at least a subset of network nodes 135 to host the virtual router instances. The network nodes 135 for creating instances of a given virtual router may be selected, e.g., randomly, or based on one or more selection criteria (e.g., selecting network nodes that are currently hosting the least number of virtual router instances, handle the least amount of network traffic, or use the least amount of a certain computing resource).

Responsive to receiving command 214, each network node 135A-135B may configure a virtual router instance using the received router configuration settings (216, 218). Upon creating the virtual router instances, the master instance can be elected (220), and the remaining instances can be designated as standby instances. The master instance election may be performed using pre-configured node priorities, randomly assigned identifiers, and/or unique identifiers associated with the network nodes on which the standby instances are running. Once the new master instance is elected, the IP addresses which have been reserved for the router interfaces may be assigned (222) to the master instance.

As noted herein above, L3 agent 155 running on each network node 135 may be employed to monitor the IP address assignment to the network interfaces on the node. L3 agent 155 may aggregate, into a single message to be transmitted to network management unit 140, the detected state transitions for a certain period of time and transmit (224, 226), via a messaging server, the status message to network controller 140.

In operation, the master instance of the virtual router may be configured to transmit, over a highly-available network, heartbeat messages (228) to the network nodes running the standby instances of the same virtual router. As the heartbeat messages should be transmitted with a pre-defined frequency (e.g., ever 2 seconds), a state monitor process associated with a standby instance failing to receive a pre-defined number of consecutive heartbeat messages from the master instance may initiate a new master instance election (230) among the standby instances, as described in more details herein above.

Figure 3:
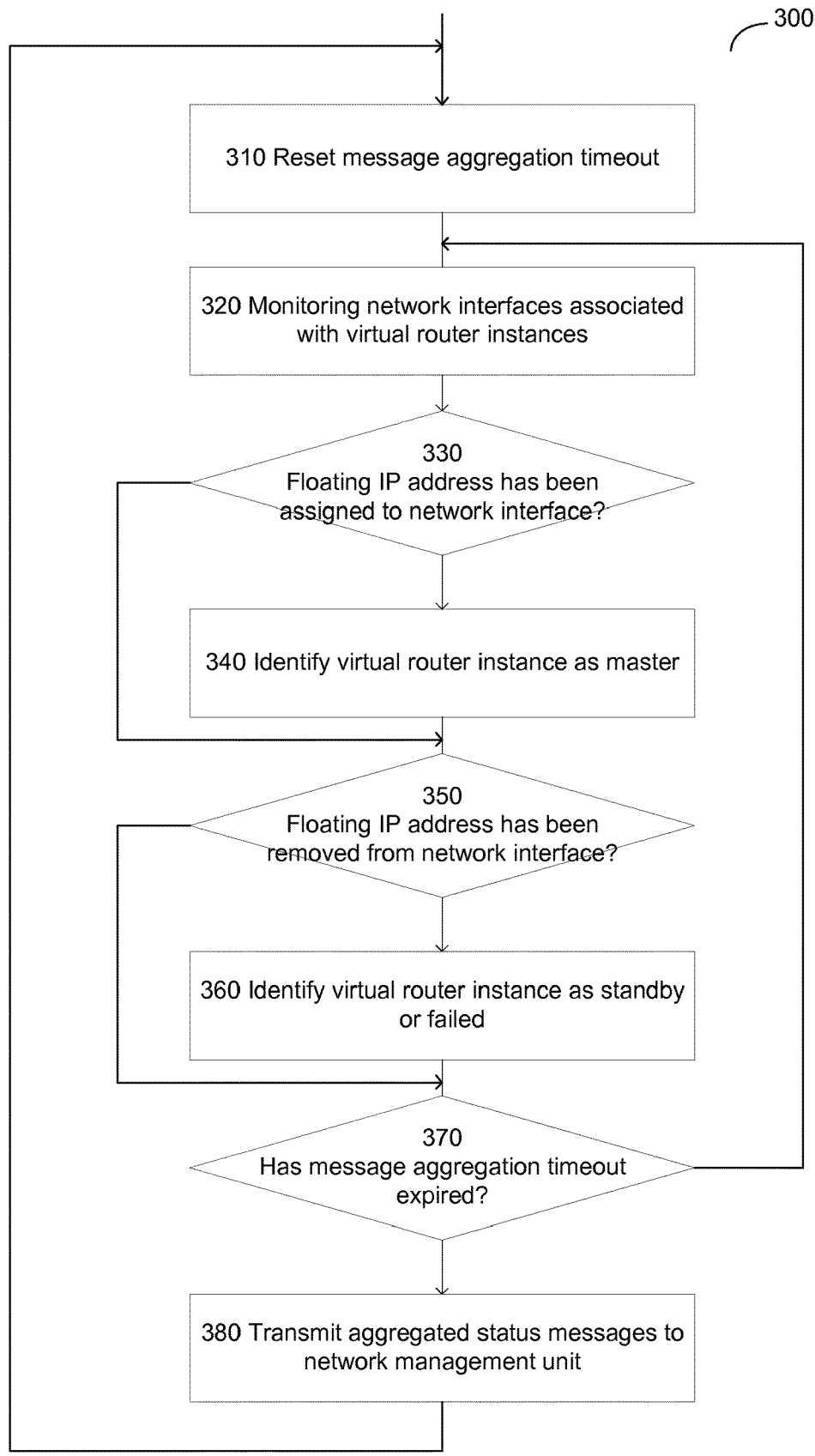
FIG. 3 depicts a flow diagram of a method of determining the state of a virtual router instance, in accordance with one or more aspects of the present disclosure.

FIG. 3 depicts a flow diagram of one illustrative example of method 300 of determining the state of a virtual router instance, in accordance with one or more aspects of the present disclosure. Method 300 and/or each of its individual functions, routines, subroutines, or operations may be performed by one or more processing devices of the computer system (e.g., host computer system 100 of FIG. 1) implementing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, a processing device of a network node implementing the method may reset the message aggregation timeout to be employed for aggregating multiple virtual router state transition events into a single message to be transmitted to the network management unit, as described in more details herein above.

At block 320, the processing device may monitor the network interfaces of a network node on which one or more virtual routers are configured, as described in more details herein above.

Responsive to determining, at block 330, that an IP address associated with an instance of a virtual router has been assigned to a network interface of the network node, the processing device may, at block 340, identify the virtual router instance running on the local node as the master instance. The state transition event may be appended to a message to be transmitted to the network management unit upon the timeout expiration, as described in more details herein above.

Responsive to determining, at block 350, that an IP address associated with an instance of a virtual router has been removed from a network interface of the network node, the processing device may, at block 360, identify the virtual router instance running on the local node as the a standby instance of a failed instance. The state transition event may be appended to a message to be transmitted to the network management unit upon the timeout expiration, as described in more details herein above.

Responsive to determining, at block 370, that the message aggregating timeout has expired, the processing device may, at block 380, transmit the aggregated virtual router state transition message to the network management unit, as described in more details herein above; the method may loop back to block 310.

Figure 4:
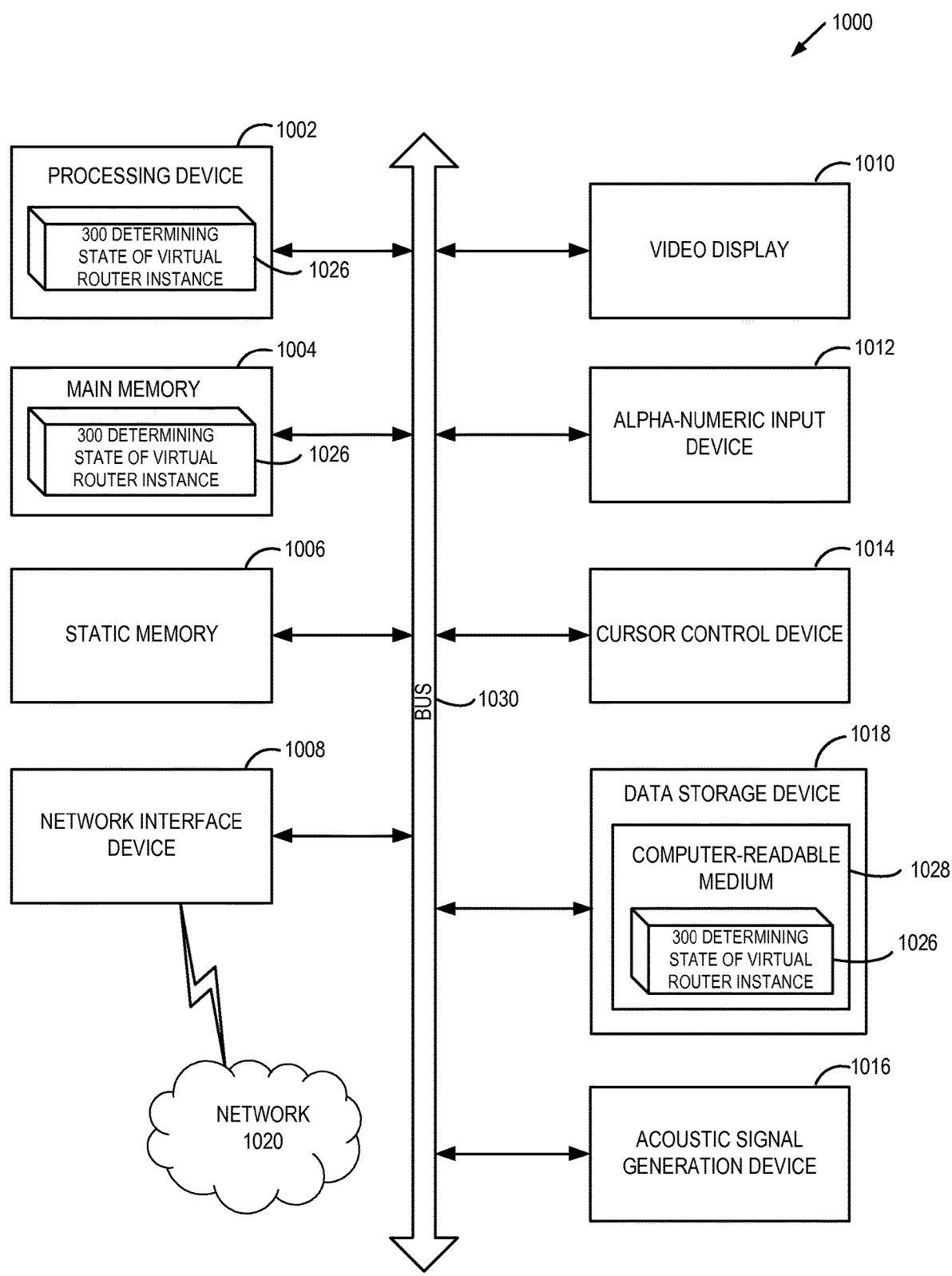
FIG. 4 depicts a block diagram of an example computer system operating in accordance with one or more aspects of the present disclosure.

FIG. 4 schematically illustrates a component diagram of an example computer system 1000 which can perform any one or more of the methods described herein. In various illustrative examples, computer system 1000 may represent a compute node 110 and/or a network node 135 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute instructions implementing method 300 for determining the state of a virtual router instance.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of method 300 for determining the state of a virtual router instance.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 4 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
    monitoring, by a processing device of a host computer system, a network interface associated with an instance of a virtual router;
    responsive to determining that a certain IP address has been assigned to the network interface, detecting a first state transition of the instance of the virtual router to a master state;
    responsive to determining that the certain IP address has been disassociated from the network interface, detecting a second state transition of the instance of the virtual router to one of: a standby state or a failed state;
    aggregating, over a predefined period of time, multiple detected state transitions including the first state transition and the second state transition; and
    transmitting a message reflecting the multiple detected state transitions of a plurality of virtual routers running on the host computer system.

2. The method of claim 1, wherein transmitting the message is performed periodically with a certain frequency.

3. The method of claim 1, wherein the message comprises state identifiers of instances of at least two virtual routers.

4. The method of claim 1, wherein transmitting the message to a router state database is performed via a message broker.

5. The method of claim 1, wherein the virtual router is employed to route Open Systems Interconnection (OSI) layer 3 packets between a tenant network and a physical router.

6. The method of claim 1, wherein the virtual router is employed to perform stateless filtering of OSI layer 3 packets being routed between a tenant network and a physical router.

7. The method of claim 1, further comprising:
    responsive to determining that a master instance of the virtual router has transitioned into an inactive state, designating a standby instance of the virtual router as a new master instance.

8. The method of claim 1, wherein the message identifies a state of the instance of the virtual router.

9. A system comprising:
    a memory; and
    a processing device, operatively coupled to the memory, to:
        monitor a network interface associated with an instance of a virtual router;

responsive to determining that a certain IP address has been assigned to the network interface, detect a first state transition of the instance of the virtual router to a master state;

responsive to determining that the certain IP address has been disassociated from the network interface, detect a second state transition of the instance of the virtual router to one of: a standby state or a failed state;

aggregate, over a predefined period of time, multiple detected state transitions including the first state transition and the second state transition; and transmit a message reflecting the multiple detected state transitions of a plurality of virtual routers running on the host computer system.

10. The system of claim 9, wherein transmitting the message is performed periodically with a certain frequency.

11. The system of claim 9, wherein the message comprises state identifiers of instances of at least two virtual routers.

12. The system of claim 9, wherein the virtual router is employed to route Open Systems Interconnection (OSI) layer 3 packets between a tenant network and a physical router.

13. The system of claim 9, wherein the virtual router is employed to perform stateless filtering of OSI layer 3 packets being routed between a tenant network and a physical router.

14. The system of claim 9, wherein the processing device is further to:

responsive to determining that a master instance of the virtual router has transitioned into an inactive state, designate a standby instance of the virtual router as a new master instance.

15. The system of claim 9, wherein the message identifies a state of the instance of the virtual router.

16. A computer-readable non-transitory storage medium comprising executable instructions to cause a processing device to:

monitor, by the processing device, a network interface associated with an instance of a virtual router;

responsive to determining that a certain IP address has been assigned to the network interface, detect a first state transition of the instance of the virtual router to a master state;

responsive to determining that the certain IP address has been disassociated from the network interface, detect a second state transition of the instance of the virtual router to one of: a standby state or a failed state;

aggregate, over a predefined period of time, multiple detected state transitions including the first state transition and the second state transition; and transmit a message reflecting the multiple detected state transitions of a plurality of virtual routers running on a host computer system.

17. The computer-readable non-transitory storage medium of claim 16, wherein the virtual router is employed to route Open Systems Interconnection (OSI) layer 3 packets between a tenant network and a physical router.

18. The computer-readable non-transitory storage medium of claim 16, wherein the virtual router is employed to perform stateless filtering of OSI layer 3 packets being routed between a tenant network and a physical router.

19. The computer-readable non-transitory storage medium of claim 16, further comprising executable instructions to cause the processing device to:

responsive to determining that a master instance of the virtual router has transitioned into an inactive state, designate a standby instance of the virtual router as a new master instance.

20. The computer-readable non-transitory storage medium of claim 16, wherein the message identifies a state of the instance of the virtual router.

* * * * *

UNITED STATES PATENT AND TRADEMARK OFFICE
CERTIFICATE OF CORRECTION

PATENT NO. : 11,283,907 B2
APPLICATION NO. : 14/840317
DATED : March 22, 2022
INVENTOR(S) : Assaf Muller and Sylvain Afchain It is certified that error appears in the above-identified patent and that said Letters Patent is hereby corrected as shown below:

In the Claims

In Claim 9, Column 8, Line 1, insert --host computer-- before "system".

In Claim 10, Column 9, Line 1, insert --host computer-- before "system".

In Claim 11, Column 9, Line 1, insert --host computer-- before "system".

In Claim 12, Column 9, Line 1, insert --host computer-- before "system".

In Claim 13, Column 9, Line 1, insert --host computer-- before "system".

In Claim 14, Column 9, Line 1, insert --host computer-- before "system".

In Claim 15, Column 9, Line 1, insert --host computer-- before "system".

Signed and Sealed this
Sixth Day of February, 2024

Katherine Kelly Vidal
*Director of the United States Patent and Trademark Office*